United States Patent
Wróblewska et al.

(10) Patent No.: US 12,379,454 B2
(45) Date of Patent: Aug. 5, 2025

(54) METHOD FOR ESTIMATING A POSITION OF AN OBJECT

(71) Applicant: Aptiv Technologies AG, Schaffhausen (CH)

(72) Inventors: Aleksandra Wróblewska, Cracow (PL); Mateusz Romaszko, Cracow (PL); Grzegorz Wyszynski, Cracow (PL)

(73) Assignee: Aptiv Technologies AG, Schaffhausen (CH)

(*) Notice: Subject to any disclaimer, the term of this patent is extended or adjusted under 35 U.S.C. 154(b) by 321 days.

(21) Appl. No.: 18/184,401

(22) Filed: Mar. 15, 2023

(65) Prior Publication Data

US 2023/0333204 A1 Oct. 19, 2023

(30) Foreign Application Priority Data

Apr. 14, 2022 (EP) ..................... 22168413

(51) Int. Cl.
*G01S 5/14* (2006.01)
*G01S 11/02* (2010.01)
*H04W 4/40* (2018.01)

(52) U.S. Cl.
CPC .......... *G01S 5/14* (2013.01); *G01S 11/02* (2013.01); *H04W 4/40* (2018.02); *G01S 2205/01* (2020.05)

(58) Field of Classification Search
CPC ........ G01S 5/14; G01S 11/02; G01S 2205/01; H04W 4/40
USPC ................. 342/128, 189, 352, 450
See application file for complete search history.

(56) References Cited

U.S. PATENT DOCUMENTS

2018/0188824 A1* 7/2018 Dunne ............... G06F 3/0237

FOREIGN PATENT DOCUMENTS

| EP | 3118646 | 1/2021 |
|---|---|---|
| WO | 2005062066 | 7/2005 |
| WO | 2011087529 | 7/2011 |
| WO | 2018188824 | 10/2018 |

OTHER PUBLICATIONS

"Extended European Search Report", EP Application No. 22168413.7, Oct. 11, 2022, 8 pages.

* cited by examiner

*Primary Examiner* — Bo Fan
(74) *Attorney, Agent, or Firm* — Harness, Dickey & Pierce, P.L.C.

(57) ABSTRACT

The present disclosure relates to a method for estimating a position of an object by determining a distance from the object to a sensor module and determining a starting reference space indicative of a position estimate of the object. The method also includes performing a plurality of successive division operations of the starting reference space for improving the position estimate of the object until a predetermined criterion is met. A division operation includes dividing the current reference space into subspaces. Further, the method includes assigning, on each of the subspaces, a confidence factor indicating a confidence that the object is positioned in the respective subspace, and selecting a new reference space from the subspaces based on the confidence factors. The method further comprises determining the position of the object based on the new reference space according to the last division operation.

20 Claims, 8 Drawing Sheets

METHOD FOR ESTIMATING A POSITION OF AN OBJECT

INCORPORATION BY REFERENCE

This application claims priority to European Patent Application No. EP22168413.7, filed Apr. 14, 2022, the disclosure of which is incorporated by reference in its entirety.

BACKGROUND

Classical methods of localizing a position of a radio-frequency transmitter, referred to as the object in the following, are based on low-frequency localization techniques. These conventional methods are based on repeated measurements of the strength of the electromagnetic field transmitted by the object and comparing the measured values against previously gathered data. This so-called "fingerprinting" approach gives a rough estimate for an area in which the object is located. However, the position of the object estimated in this way lacks accuracy.

Modern approaches rely on technologies such as Bluetooth-based location and Ultrawideband-based location. Bluetooth-based location is based on phase-based ranging, time-of-flight and/or angle-of-arrival measurements, while Ultrawideband-based location focuses on time-of-flight measurements. With these technologies it is possible to estimate the position of the objects with higher accuracy. For many applications the accuracy is preferably 10 cm or better.

Conventional methods for estimating the position of the object based on the measurements employ solutions such as Linear Least Squares or Kernel-based solutions.

SUMMARY

The novel approach proposed in the present disclosure provides methods for estimating a position of an object in relation to a plurality of sensor modules. The term "object" describes a device transmitting a signal which can be measured by the plurality of sensor modules.

Compared to conventional approaches, the proposed method aims to achieve a more accurate position estimate which is based on measurement data containing inaccuracies and which can be more efficiently computed. The proposed method processes measurement data from the plurality of sensor modules without using complicated mathematical formulas but using only basic arithmetic operations. Hence, the proposed method may provide improved computational efficiency compared to conventional approaches and can therefore be implemented on low-power computing devices. Furthermore, it may be possible to adjust the level of accuracy of the estimated position of the object to specific requirements.

One aspect relates to a method for estimating a position of an object in relation to a plurality of sensor modules mounted on a device. The method comprises determining, for each of the plurality of sensor modules, a distance from the object to the respective sensor module by exchanging signals between the object and the respective sensor module, and determining a starting reference space indicative of a position estimate of the object based on the plurality of determined distances and positions of the plurality of sensor modules on the device. The method also comprises performing a plurality of successive division operations of the starting reference space for improving the position estimate of the object until a predetermined criterion is met. Each division operation comprises dividing the current reference space into subspaces each indicating a possible position of the object, assigning, on each of the subspaces, a confidence factor indicating a confidence that the object is positioned in the respective subspace, and selecting a new reference space from the subspaces based on the confidence factors. Finally, the method comprises determining the position of the object based on the new reference space according to the last division operation.

In another aspect, the starting reference space and the subspaces are defined by boundaries parallel to one or more axes of a coordinate system, and the coordinate system is defined in accordance with the distance measurements of the plurality of sensor modules.

In another aspect, in each division operation, the division of the current reference space is performed parallel to one or more axes of the coordinate system.

In another aspect, the one or more axes of the coordinate system parallel to which the division is performed change between successive division operations.

In another aspect, each division operation divides the current reference space into two subspaces of equal size.

In another aspect, the step of selecting a new reference space comprises determining, for each subspace, a centroid of the respective subspace, calculating, for each subspace, the confidence factor based on distances from the position of each sensor module to the centroid of the respective subspace and the distance determined by each sensor module.

In another aspect, the plurality of distances includes a plurality of uncertainties based on a localization accuracy of each of the plurality of sensor modules.

In another aspect, the predetermined criterion is met when at least one of a first criterion and a second criterion is met, wherein the first criterion which is met when the number of division operations exceeds a predetermined number, and the second criterion which is met when a size of the new reference space is smaller than a predetermined threshold size.

In another aspect, the plurality of distances is determined based on time-of-flight measurements, signal strength measurements or phase-based ranging.

In another aspect, the object is provided by a key, a wearable device or a portable computing device.

In another aspect, the device is a vehicle, a door or a storage space.

In another aspect, the method further comprises unlocking the vehicle, the door or the storage space based on the determined position of the object.

In another aspect, the object and the plurality of sensor modules are based on Bluetooth technology or Ultrawideband technology.

In another aspect, a data processing apparatus comprises means for carrying out the method of any one of the previous claims.

In another aspect, a vehicle comprises the data processing apparatus according to claim 14.

DETAILED DESCRIPTION

Figure 1:
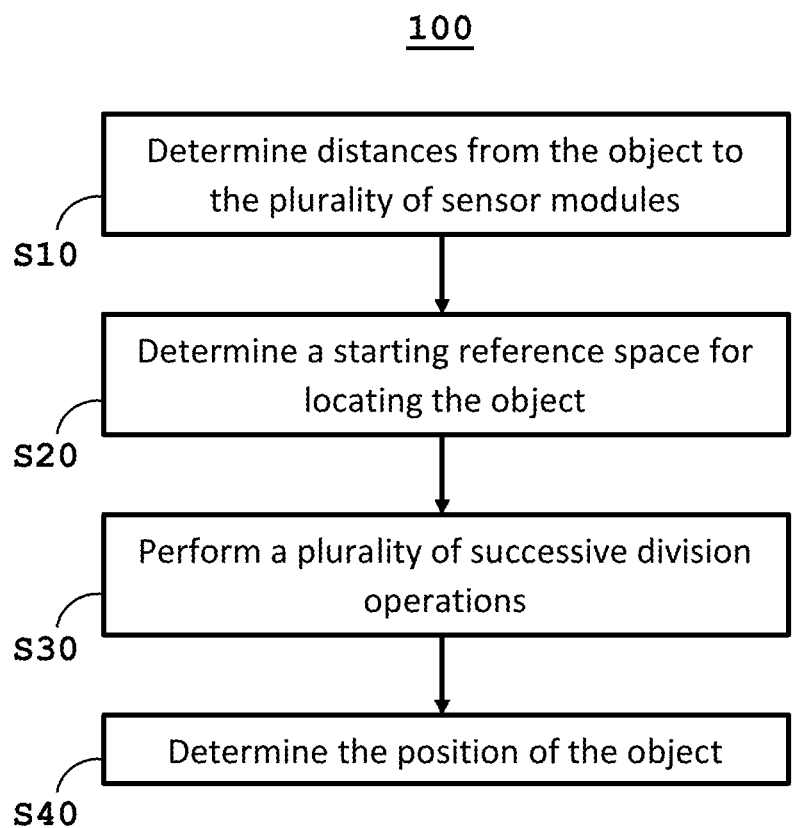
FIG. 1 shows a flow chart of a method for estimating a position of an object in relation to a plurality of sensor modules.

The present invention shall now be described in conjunction with specific embodiments. The specific embodiments serve to provide the skilled person with a better understanding but are not intended to in any way restrict the scope of the invention, which is defined by the appended claims. In particular, the embodiments described independently throughout the description can be combined to form further embodiments to the extent that they are not mutually exclusive.

The proposed method aims to estimate a position of an object in relation to a plurality of sensor modules. The term "object" describes a device transmitting a signal which can be measured by the plurality of sensor modules. The signal may be an acoustic signal, an optic signal such as a pulsed laser light signal, or an invisible electromagnetic signal such as an infrared signal, a radio-frequency signal or a low-frequency signal or the like.

A distance from the object to each of the plurality of sensor modules is determined by exchanging signals between the object and the respective sensor module. The exchange of signals may be unidirectional or bidirectional. In the case of an unidirectional exchange of signals, the object may be configured to transmit the signal and each of the plurality of sensor modules may be configured to receive the signal. In the case of a bidirectional exchange of signals both the object and each of the plurality of sensor modules may transmit and receive signals.

The determining of the distance from the object to each of the plurality of sensor modules comprises measuring the signal received by each of the plurality of sensor modules. This way, a plurality of distance measurements is generated, wherein each of the distance measurements corresponds to the determined distance from the object to each of the respective sensor modules.

Each determined distance may include an uncertainty based on a measurement accuracy of the corresponding sensor module. The uncertainty may be the value of standard deviation, variance or dispersion of the measurement. The uncertainty may be based on limitations of the underlying technology employed for receiving and measuring the signal. The uncertainty may be based on a standard deviation of a series of signal measurements at fixed distance.

The plurality of sensor modules may be dynamic, meaning the positions of the plurality of sensor modules may change over time. The positions of the plurality of sensor modules may change with respect to each other. The sensor modules are mounted on a device comprising the plurality of sensor modules such that the positions of the sensor modules may be static with respect to each other, but the device may be dynamic, meaning that the position of the device may change over time. The device comprising the plurality of sensor modules may be a data processing apparatus used to process the plurality of distances according to the proposed method. Alternatively, the device may transmit the plurality of distances to an external data processing apparatus to process the measurements.

The positions of the plurality of sensor modules, the plurality of distances and the estimated position of the object may be given by coordinates of two dimensions or three dimensions. In order to uniquely determine the position of the object in two dimensions, distance measurements from at least three sensor modules are required. In order to uniquely determine the position of the object in three dimensions, distance measurements from at least four sensor modules are required. For the purpose of concise and simple illustrations, the examples described in the present disclosure are presented in two dimensional coordinates. In this case, the term "space" refers to an area. In three dimensions, the term "space" refers to a volume.

FIG. 1 shows a flow chart of a method 100, according to an aspect, for estimating a position of an object in relation to a plurality of sensor modules mounted on a device.

In step S10 of method 100, for each of the plurality of sensor modules, a distance from the object to the respective sensor module is determined by exchanging signals between the object and the respective sensor module.

In step S20 of method 100, a starting reference space indicative of a position estimate of the object is determined based on the plurality of determined distances and positions of the plurality of sensor modules on the device.

In step S30 of method 100, a plurality of successive division operations of the starting reference space for improving the position estimate of the object is performed until a predetermined criterion is met. Each division operation comprises dividing the current reference space into subspaces each indicating a possible position of the object, assigning, on each of the subspaces, a confidence factor indicating a confidence that the object is positioned in the respective subspace, and selecting a new reference space from the subspaces based on the confidence factors.

In the first division operation of the plurality of successive division operations, the starting reference space of step S20 serves as the current reference space. In subsequent division operations, the new reference space according to the previous division operation serves as the current reference space.

Figure 2:
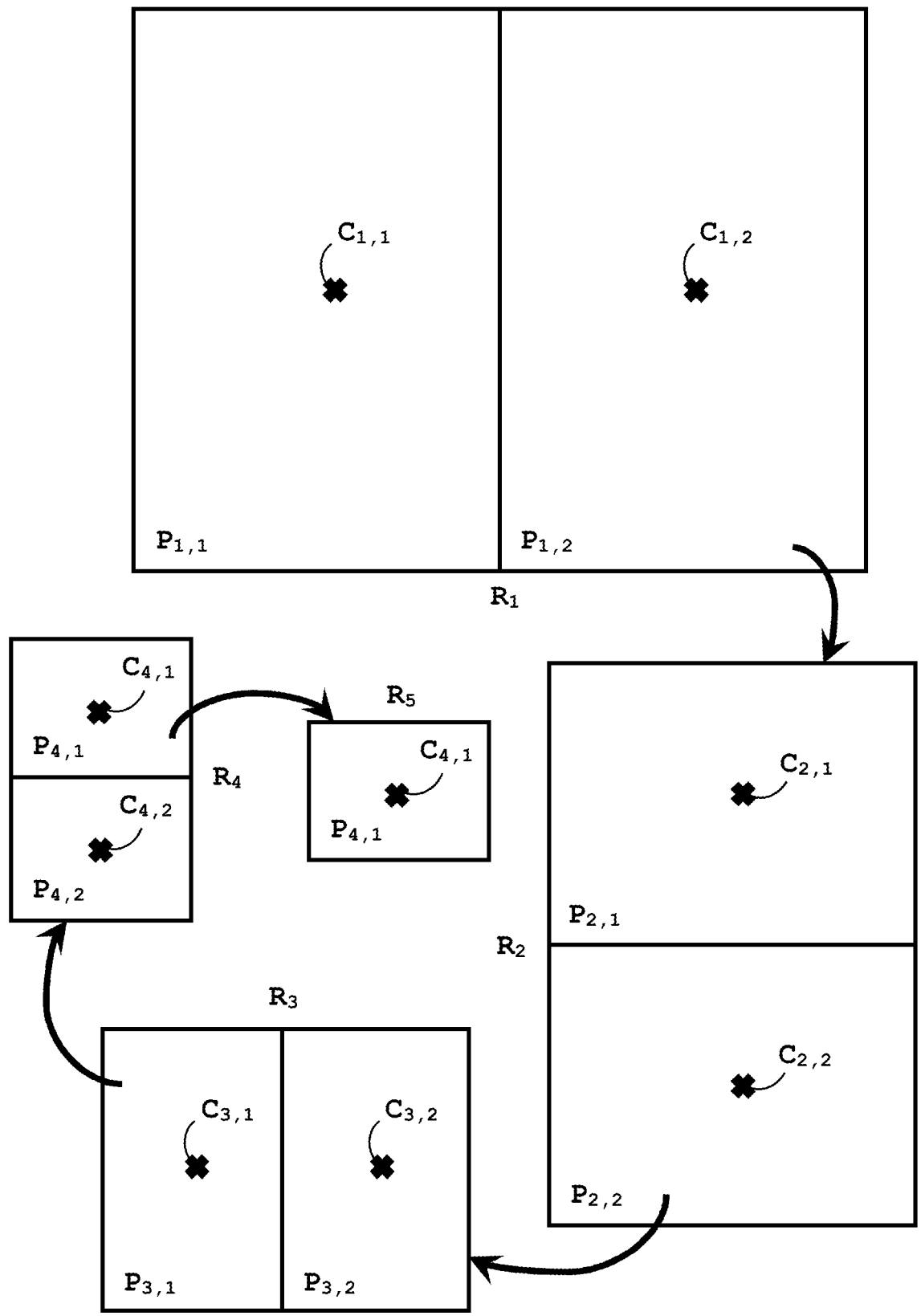
FIG. 2 shows an example for a plurality of successive division operations based on a 2-dimensional starting reference space.

FIG. 2 shows an example for a plurality of successive division operations based on a 2-dimensional starting reference space R1 having a rectangular shape and being divided in four successive division operations as indicated by the arrows in clockwise direction. The starting reference space and the subspaces may have any shape. Preferably, the starting reference space and the subspaces may be defined by boundaries parallel to one or more axes of a coordinate system, which may reduce the complexity of the division operations. The coordinate system may be defined in accordance with the distance measurements of the plurality of sensor modules. The axes of the coordinate system may preferably be orthogonal.

Furthermore, the one or more axes of the coordinate system parallel to which the division is performed may change between successive division operations. In the present example, the first division operation is performed parallel to the y-axis, the second division operation is performed parallel to the x-axis, the third division operation is performed parallel to the y-axis and the fourth division operation is performed parallel to the x-axis. In other words, the division axis is changed in an alternating manner between successive division operations. However, two or more successive division operations may also be performed parallel to the same axis.

In this example, the predetermined criterion is met when the number of division operations exceeds the predetermined number four. The number of division operations may be less than four or may be more than four. By predetermining the number of division operations, the method 100 can be performed in a fixed amount of time and using a fixed amount of processing power. Alternatively, the predetermined criterion may be a condition which is dynamically determined, such that the predetermined criterion is met when a size of the selected new reference space is smaller than a predetermined threshold size. This way, the method 100 can be adjusted to estimate the position of the object T with a specified level of accuracy.

In a first division operation, the current (starting) reference space R1 is divided into two subspaces $P_{1,1}$ and $P_{1,2}$, and $P_{1,2}$ is selected, based on a confidence factor on each of the subspaces $P_{1,2}$, and $P_{1,2}$, as the new reference space $R_2$ to be used in the subsequent division operation. The confidence factor on a subspace $P_{i,j}$ may be based on a centroid, or center-of-gravity, $C_{i,j}$ of the subspace $P_{i,j}$, wherein i is an integer enumerating the plurality of division operations and j is an integer enumerating the plurality of subspaces for a given division operation. The centroid of a space describes a geometric center of a space and may be computed as the arithmetic mean position of all the points in the space. The assigning of the confidence factors will be described in detail later.

In a second division operation, the current reference space $R_2$ is divided into two subspaces $P_{2,1}$ and $P_{2,2}$, and $P_{2,2}$ is selected as the new reference space $R_3$. In a third division operation, the current reference space R3 is divided into two subspaces $P_{3,1}$ and $P_{3,2}$, and $P_{3,1}$ is selected as the new reference space $R_4$. In a fourth division operation, the current reference space $R_4$ is divided into two subspaces $P_{4,1}$ and $P_{4,2}$, and $P_{4,1}$ is selected as the new reference space $R_5$.

In step S40 of method 100, the position of the object is determined based on the new reference space according to the last division operation. The position of the object may be determined as the position of the centroid of the new reference space according to the last division operation. In the example of FIG. 2, the position of the object is determined based on the new reference space $R_5$ and the position of the object may be determined based on the centroid $C_{4,1}$. The determining of the position of the object will be described in detail later.

Figure 3:
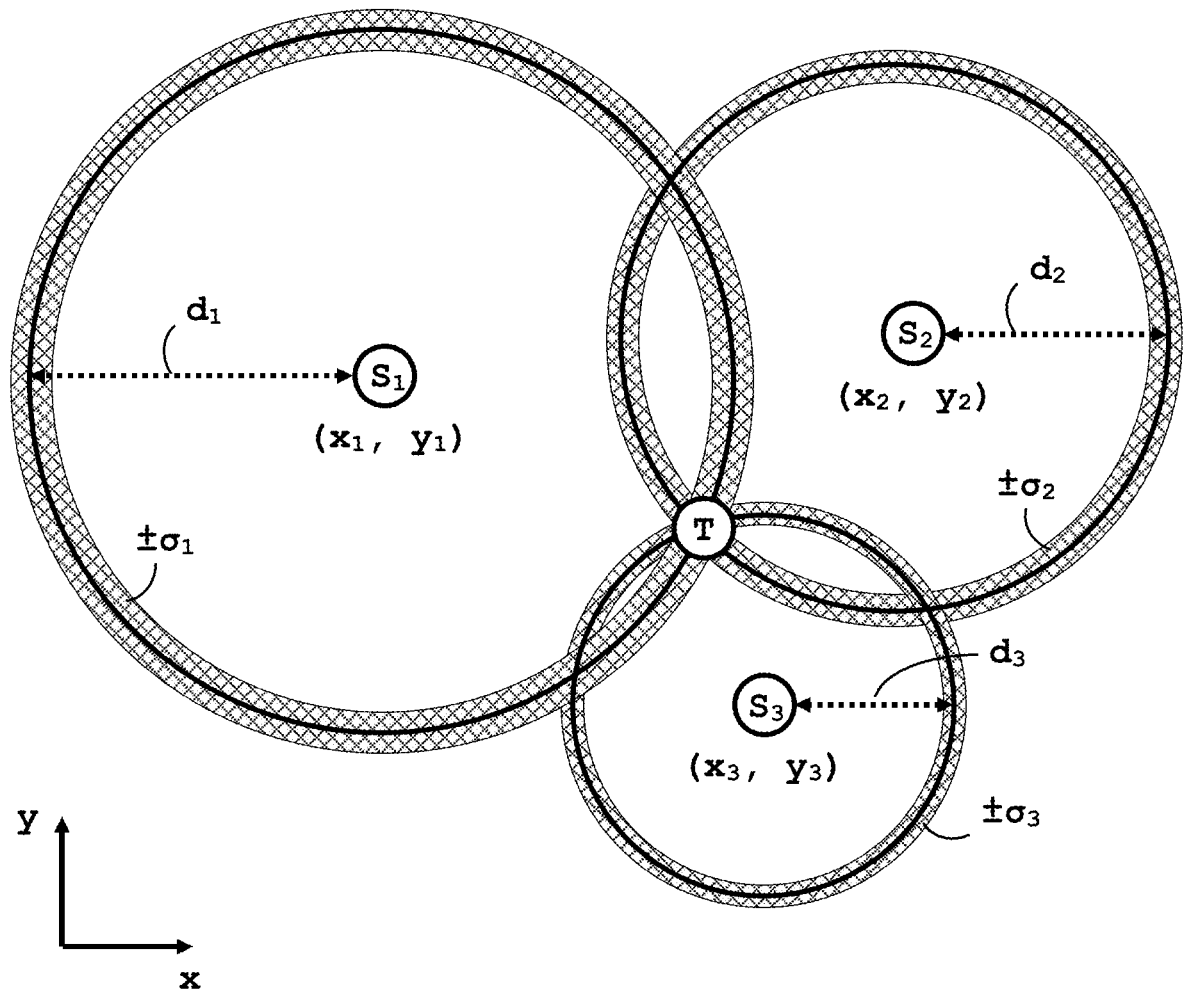
FIG. 3 shows an example for a positional relationship between an object and three sensor modules measuring three distances.

FIG. 3 shows an example for a positional relationship between an object T and three sensor modules $S_1$, $S_2$, and $S_3$ determining, in step S10 of method 100, the three distances $d_1$, $d_2$ and $d_3$. In the example, the distances $d_1$, $d_2$, and $d_3$ further include a plurality of uncertainties $\sigma_1$, $\sigma_2$ and $\sigma_3$ as indicated by the hatched error band. The uncertainties $\sigma_1$, $\sigma_2$ and $\sigma_3$ may be based on measurement accuracies of the sensor modules $S_1$, $S_2$, and $S_3$, respectively. In the example, the uncertainties $\sigma_1$, $\sigma_2$, and $\sigma_3$ are symmetric, but the uncertainties $\sigma_1$, $\sigma_2$, and $\sigma_3$ may be asymmetric. The position of the sensor modules $S_1$, $S_2$, and $S_3$ are $(x_1, y_1)$, $(x_2, y_2)$ and $(x_3, y_3)$, respectively. The circles around the sensor modules $S_1$, $S_2$, and $S_3$ with a radius corresponding to the determined distances $d_1$, $d_2$, and $d_3$, respectively, may intersect at the position of the object T which is to be determined.

Figure 4:
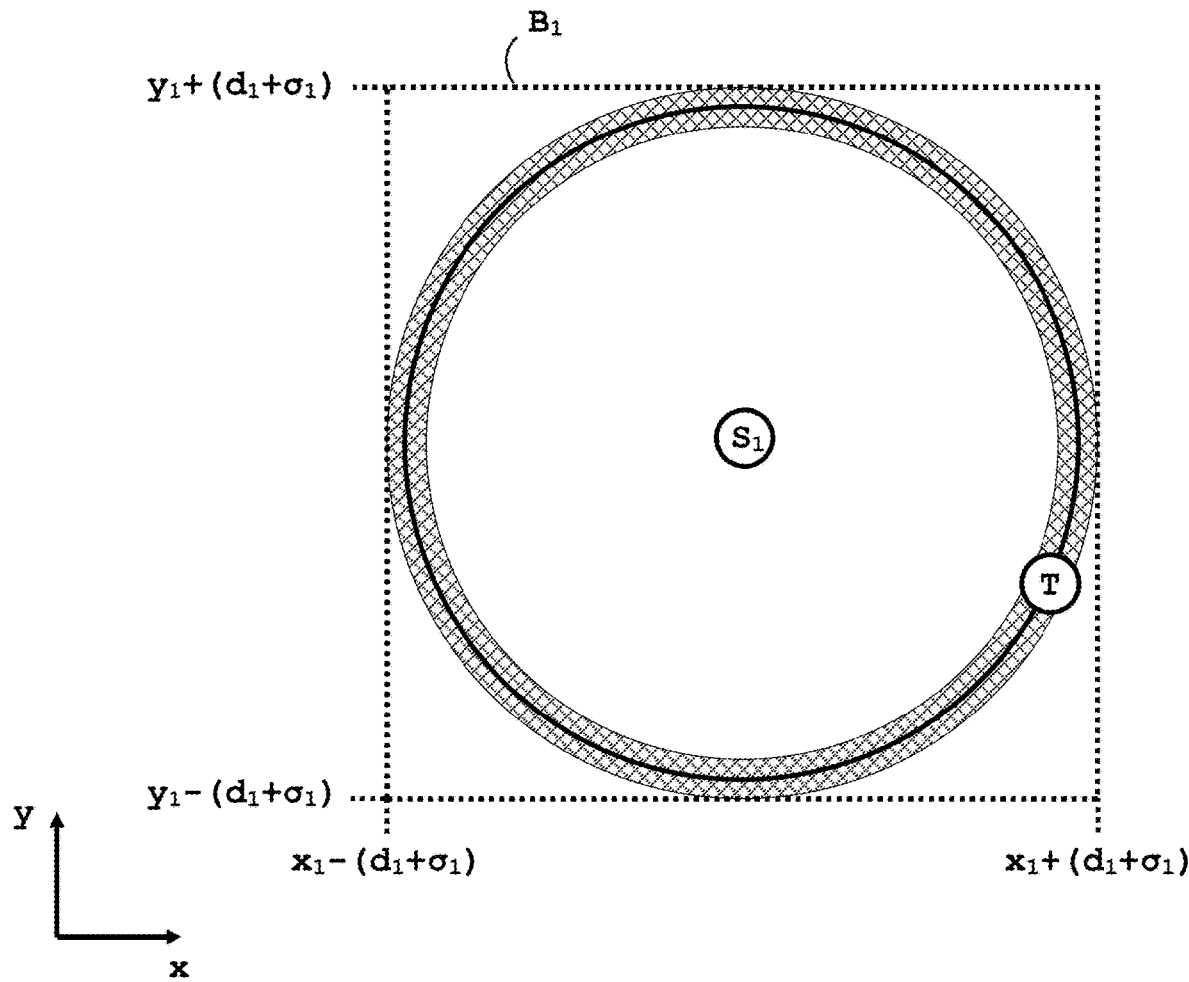
FIG. 4 shows an example for a bounding box for a first sensor module based on a determined distance to the object.

FIG. 4 shows an example for a bounding box $B_1$ for the first sensor module $S_1$ according to the previous example given with reference to FIG. 3. The bounding box $B_1$ is based on the determined distance $d_1$ to the object and the uncertainty $\sigma_1$ of the measurement. The coordinates of the lower/upper boundaries of bounding box $B_1$ are determined by subtracting/adding the sum of the distance $d_1$ and the uncertainty $\sigma_1$ from/to each of the coordinate value of the position $(x_1, y_1)$ of the sensor module $S_1$. Alternatively, bounding box may be computed without the uncertainty $\sigma_1$, that is by setting $\sigma_1$ to zero. The bounding boxes $B_2$ and $B_3$ of the sensor module $S_2$ and $S_3$ may be computed in the same manner. Note that the determination of the bounding boxes merely serves to facilitate the description of determining the starting reference space R1 and may be omitted in the step S20 of method 100.

Figure 5:
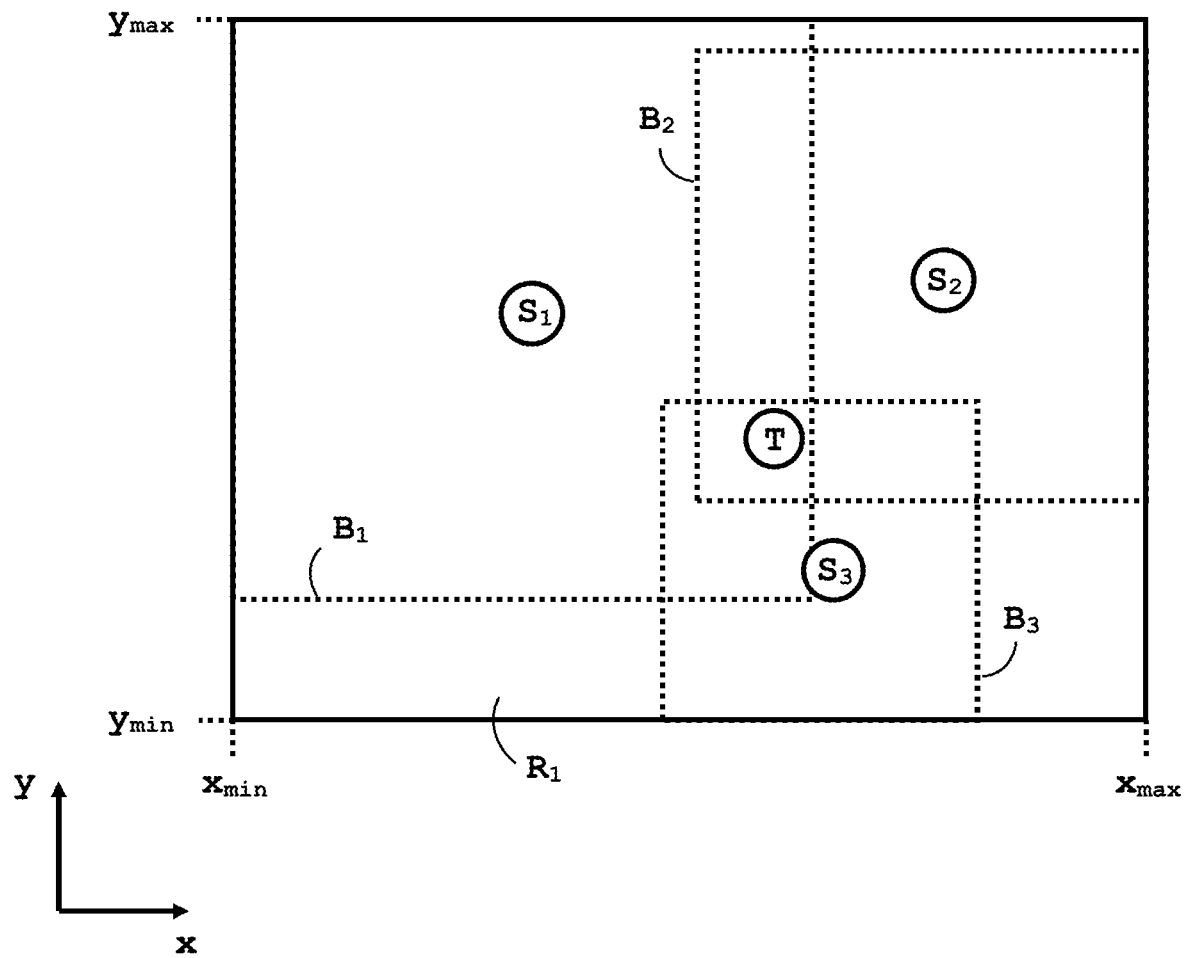
FIG. 5 shows an example for a starting reference space based on the three determined distances.

FIG. 5 shows an example for determining a starting reference space $R_1$ based on the three determined distances $d_1$, $d_2$, and $d_3$. The distances $d_1$, $d_2$, and $d_3$ may include the plurality of uncertainties $\sigma_1$, $\sigma_2$, and $\sigma_3$, as discussed in the previous examples given with reference to FIGS. 3 and 4. The coordinates of lower boundaries $x_{min}$ and $y_{min}$ and upper boundaries $x_{max}$ and $y_{max}$ of the starting reference space $R_1$ are determined by computing the minimum and maximum coordinate values, respectively, of all bounding boxes. In the present example with three sensor modules $S_1$, $S_2$, and $S_3$, the coordinate values of the starting reference space $R_1$ may be computed as:

$$x_{min} = \min\{x_1 - (d_1 + \sigma_1), x_2 - (d_2 + \sigma_2), x_3 - (d_3 + \sigma_3)\}$$
$$= \min_{i=1,\ldots n}\{x_i - (d_i + \sigma_i)\},$$
$$y_{min} = \min\{y_1 - (d_1 + \sigma_1), y_2 - (d_2 + \sigma_2), y_3 - (d_3 + \sigma_3)\}$$
$$= \min_{i=1,\ldots n}\{y_i - (d_i + \sigma_i)\},$$
$$x_{max} = \max\{x_1 + (d_1 + \sigma_1), x_2 + (d_2 + \sigma_2), x_3 + (d_3 + \sigma_3)\}$$
$$= \max_{i=1,\ldots n}\{x_i + (d_i + \sigma_i)\}, \text{ and}$$
$$y_{max} = \max\{y_1 + (d_1 + \sigma_1), y_2 + (d_2 + \sigma_2), y_3 + (d_3 + \sigma_3)\}$$
$$= \max_{i=1,\ldots n}\{y_i + (d_i + \sigma_i)\}.$$

In an example with more than n=3 sensor modules, the above formulas may be adapted to include, in the computation of the minima and maxima, the coordinate values of the bounding boxes of the additional sensor modules. In an example with 3-dimensional coordinates, the above formulas may be extended to include equivalent computations for the z-coordinates, that is for a lower boundary $z_{min}$= $\min_{i=1, \ldots} n\{z_i-(d_i+\sigma_i)\}$ and an upper boundary $z_{max}$=maxi=1, . . . n$\{z_i+(d_i+\sigma_i)\}$ of the starting reference space $R_1$.

Figure 6A:
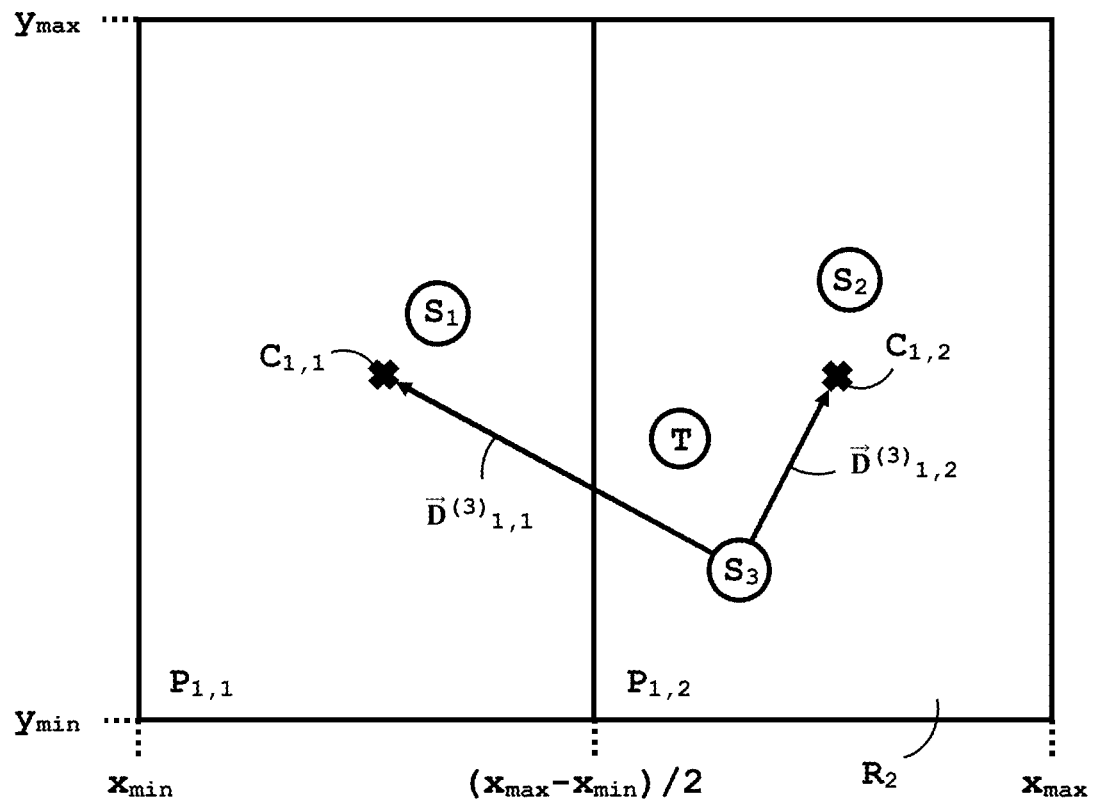
FIG. 6A shows an example for selecting a new reference space from partial spaces after a first division operation.
Figure 6B:
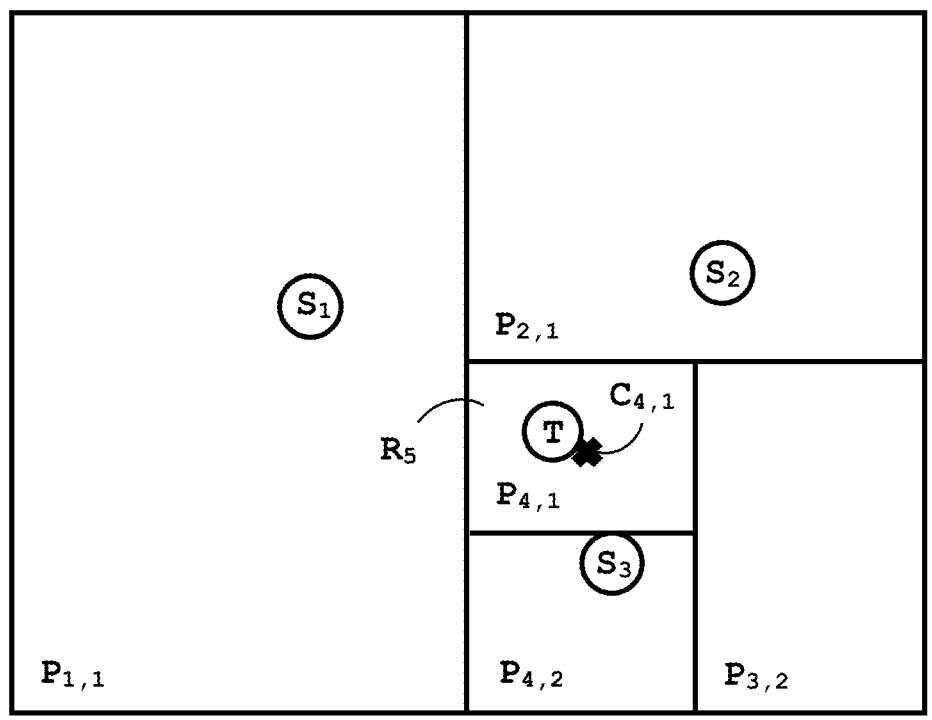
FIG. 6B shows an example for selecting a new reference space from partial spaces after a fourth division operation.

FIGS. 6A and 6B show examples for selecting a new reference space from subspaces after a first and fourth division operation, respectively, wherein the starting reference space $R_1$ is the starting reference space $R_1$ according to the previous examples given with reference to FIGS. 3 through 5.

In the first division operation of step S30 of method 100, shown in the example of FIG. 6A, the current reference space $R_1$ is divided into two subspaces $P_{1,1}$ and $P_{1,2}$. Here, the current reference space $R_1$ is divided to obtain two subspaces $P_{1,1}$ and $P_{1,2}$ of equal size (area). However, the current reference space $R_1$ may be divided into more than two subspaces and/or subspaces of different size. For example, the current reference space $R_1$ may be divided into any integer number of subspaces and the subspaces may be of equal size or vary in size.

For the purpose of concise and simple illustrations, each of the plurality of division operation, shown in the examples of FIGS. 6A and 6B, divide the current reference space in half to obtain two subspaces of equal size. In a computer implementation of the division operation, a division in half, that is a division of the coordinates by a factor of two, may be performed by a bit shift operation that shifts a binary number one place to the right, wherein the lowest order bit is removed. For a computer, such an operation is therefore inexpensive, which contributes to the overall efficiency of the method 100.

The next step of the first division operation is to select a new reference space $R_2$ from the subspaces $P_{1,1}$ and $P_{1,2}$. The new reference space $R_2$ is selected based on a confidence factor. A confidence factor is assigned to each of the subspaces $P_{1,1}$ and $P_{1,2}$. The confidence factor is indicative of a confidence that the object is positioned in the respective subspace. Depending on the definition, the confidence factor may be directly or inversely proportional to a likelihood that the object is positioned in the respective subspace. Thus, in order to improve the position estimate of the object T, a subspace with an extremal confidence factor may be selected as the new reference space. For a definition implying direct proportionality, the subspace with a maximum confidence factor is selected. For a definition implying inverse proportionality, the subspace with a minimum confidence factor is selected.

The procedure for selecting a new reference space may be the same for each of the plurality of division operations. Selecting a new reference space $R_{i+1}$ may comprise determining, for each subspace, a centroid, or center-of-gravity, $C_{i,j}$ of the respective subspace $P_{i,j}$. Here, i is an integer enumerating the plurality of division operations and j is an integer enumerating the plurality of subspaces for a given division operation.

Selecting a new reference space Ri+1 may further comprise calculating, for each subspace, a confidence factor based on distances from the position of each sensor module to the centroid of the respective subspace and the distance determined by each sensor module. In one example, the confidence factor for each subspace $P_{i,j}$ is calculated as a sum $\delta_{i,j}$ of absolute differences between (Euclidean) distances from the position of each sensor module $S_k$ to the centroid $C_{i,j}$ and the distances $d_k$ determined by each sensor module $S_k$, wherein the absolute differences are divided by the distance $d_k$ determined by each sensor module $S_k$. Here, k is an integer enumerating the plurality of sensor modules and is the index over which the sum $\delta_{i,j}$ is calculated (in the example of FIG. 6, k=1, 2, 3). Expressed in terms of a formula, the sum $\delta_{i,j}$ is computed as $$\delta_{i,j} = \Sigma_k (||\vec{D}_{i,j}^{(k)}| - d_k|/d_k),$$

where $\vec{D}_{i,j}^{(k)}$ is a vector pointing from the position of the sensor module $S_k$ to the centroid $C_{i,j}$, and the absolute value (length) $|\vec{D}_{i,j}^{(k)}|$ thereof is the (Euclidean) distance from the position of the sensor module $S_k$ to the centroid $C_{i,j}$.

The sum $\delta_{i,j}$ may serve as the confidence factor based on which the new reference space $R_{i+1}$ is selected. A subspace $P_{i,j}$ for which the calculated sum $\delta_{i,j}$ is minimum may then be selected as the new reference space $R_{i+1}$. The confidence factor may be computed in a different way. For instance, the confidence factor may be based on the uncertainty of $\sigma_k$ of each sensor module $S_k$. In this case, the sum $\delta_{i,j}$ may be adapted to multiply each summand with a factor proportional to the uncertainty $\sigma_k$ in order to suppress the effect of inaccurate measurements on the confidence factor.

In the example referred to in FIG. 6A, the subspace $P_{1,2}$ is selected as the new reference space $R_2$ based on the confidence factor described above. The procedure may then be repeated as described above with reference to FIG. 2. In the example referred to in FIG. 6B, the subspace $P_{4,1}$ is selected as the new reference space $R_5$ after a fourth division operation.

If the predetermined criterion is met, the method 100 continues with step S40, wherein the position of the object T is determined based on the new reference space $R_5$ according to the last division operation, which, in the example referred to in FIG. 6B, is the fourth division operation. The position of the object T may be determined based on the centroid $C_{4,1}$ of the new reference space $R_5$. The position of the object T may be identified with the centroid $C_{4,1}$ of the new reference space $R_5$.

The steps S20 through S40 may be repeated using different values for the uncertainties and/or changing the scheme of dividing the current reference space, for example by selecting a different set of one or more axes parallel to which the divisions are performed. For example, in the repetition of steps S20 through S40, the first division operation may divide the current reference space parallel to an axis which is orthogonal to the axis to which the first division operation of the initial performing of steps S20 through S40 was performed. The position of the object determined in the initial performing of steps S20 through S40 and the corresponding position of the object determined in the repetition may be compared and the result with the smaller $\delta_{i,j}$ may be selected.

For example, the initial performing of steps S20 through S40 may be performed using a first scheme of dividing the current reference space. The first scheme may be defined by a set of axes, such as $\{x, y, x, y, \ldots\}$, which means that the first division operation is performed parallel to the x-axis, the second division operation is performed parallel to the y-axis and so forth. For the repetition of steps S20 through S40, a second scheme may be used, such as $\{y, x, y, x, \ldots\}$, which means that that the first division operation is performed parallel to the y-axis, the second division operation is performed parallel to the x-axis and so forth. In other words, the first and second scheme describe alternating divisions which differ only in their choice of the first axis in each corresponding set of axes. The resulting positions of the object of the initial and repeated performing of steps S20 through S40 may be compared using $\delta_{i,j}$, wherein a lower $\delta_{i,j}$ is indicative of a higher confidence in the estimated position of the object.

The estimation of the position of the target according to the method 100 may be repeated to generate a time series of positions of the object. For example, the method 100 may be repeated in fixed time intervals. The time series of positions of the object may be used to construct a trajectory of the object in order to track the movement of the object.

The proposed method 100 and aspect thereof provide a computationally efficient approach for localizing an object with an adjustable level of accuracy. This way, the position of an object can be estimated using low-power computing devices in real-time.

The plurality of distances may be determined based on time-of-flight measurements, signal strength measurements and/or phase-based ranging. For example, the object may transmit a timestamped signal which is received by the plurality of sensor modules at a plurality of reception times. The difference between the timestamp and each reception time may be used to calculate the time of flight. The distance from the object to each sensor module may be calculated based on the calculated time of flight and the signal speed, such as the speed of light for an electromagnetic signal.

Alternatively, the signal strength, such as a Received Signal Strength Indicator (RSSI), may be compared to reference values to calculate the distance from the object to each sensor module. The signal strength may also be used to determine an uncertainty of the time-of-flight measurement. Alternatively, in phase-based ranging techniques, a phase difference to a reference signal may be used to calculate the distance from the object to each sensor module. The object and the plurality of sensor modules may be based on Bluetooth technology or Ultrawideband technology.

The object may be provided by a key, a wearable device or a portable computing device. For example, the object may be provided by a smartphone, a smartwatch, a fitness-tracker bracelet or the like.

The device to which the plurality of sensor modules is mounted may be a vehicle, a door or a storage space. The method 100 may further comprise unlocking the vehicle, the door or the storage space based on the determined position of the object such that a user carrying the object may gain "keyless access" to the vehicle, the door or the storage space, meaning that the user is not required to manually unlock the vehicle, the door or the storage space.

A data processing apparatus may comprise means for carrying out the method 100 or any aspect thereof. For example, the data processing apparatus may comprise or be connected to a plurality of sensor modules in order to receive a plurality of determined distances from an object to the plurality of sensor modules. The hardware structure of a data processing apparatus will be described with reference to FIG. 8.

Figure 7A:
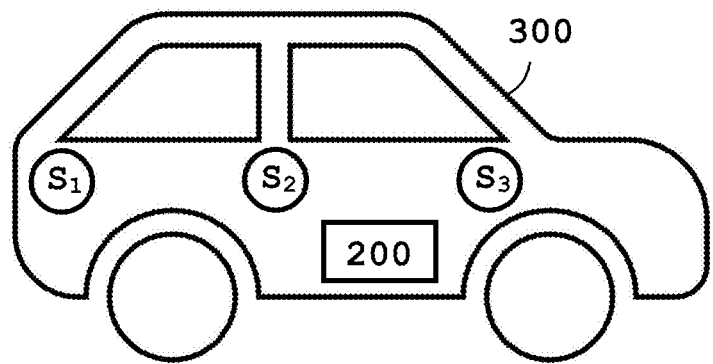
FIG. 7A shows a side-view of a vehicle comprising a plurality of sensor modules.
Figure 7B:
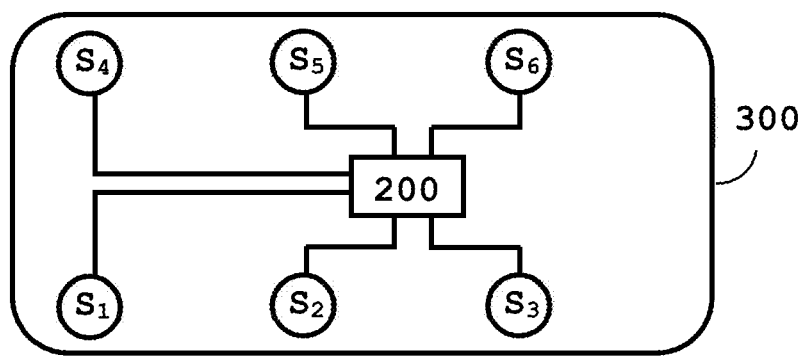
FIG. 7B shows a top-view of the vehicle comprising the plurality of sensor modules.

FIGS. 7A and 7B show a side-view and top-view of a vehicle 10, respectively. In the example, the vehicle 300 comprises sensor modules S1 through S6 and the data processing apparatus 200. The sensor module S1 through S6 are connected to the data processing apparatus 200 via an interface module. Using the data processing apparatus 200, the vehicle 300 may carry out the method 100 to estimate the position of an object. The object may be provided by a key, a wearable device or a portable computing device. This way, the data processing apparatus 200 of the vehicle 300 may, for example, determine whether or not a user carrying the object is located inside the vehicle 300. This allows the vehicle 300 to provide the user with "keyless access" to certain operations of the vehicle 300.

For example, if the user is determined to be approaching the vehicle 300, the vehicle 300 may perform an operation such as unlocking the doors. For another example, if the user is determined to be inside the vehicle 300, the vehicle 300 may perform an operation such as turning on interior lights and/or starting the engine. For yet another example, if the user is determined to have exited the vehicle 300, the vehicle 300 may perform an operation such as locking the doors and/or closing any open windows.

Figure 8:
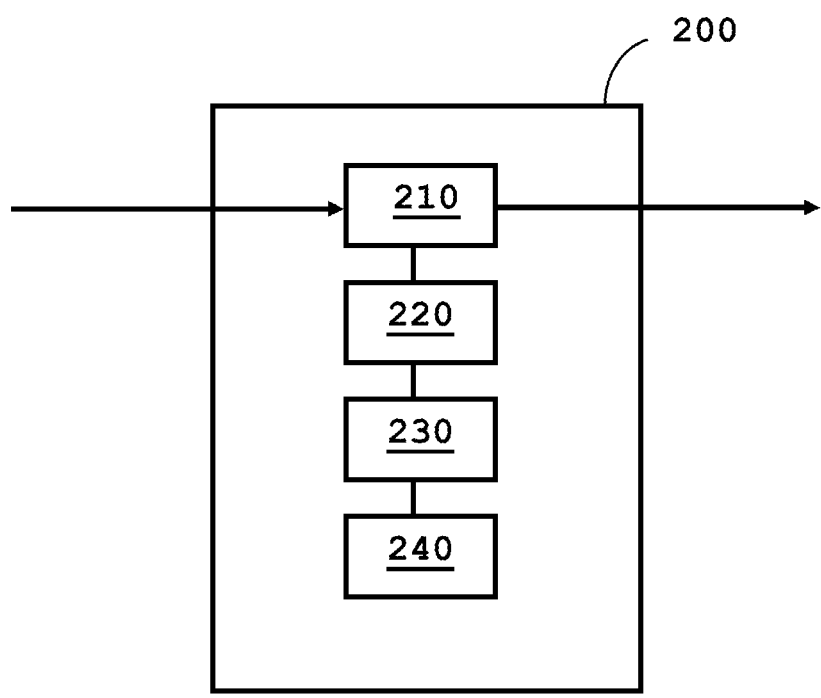
FIG. 8 shows a schematic illustration of a hardware structure of a data processing apparatus.

FIG. 8 is a schematic illustration of a hardware structure of a data processing apparatus comprising means for carrying out the steps of the methods of any of the embodiments disclosed above.

The data processing apparatus 200 has an interface module 210 providing means for transmitting and receiving information. The data processing apparatus 200 has also a processor 220 (e.g. a CPU) for controlling the data processing apparatus 200 and for, for instance, process executing the steps of the methods of any of the embodiments disclosed above. It also has a working memory 230 (e.g. a random-access memory) and an instruction storage 240 storing a computer program having computer-readable instructions which, when executed by the processor 220, cause the processor 220 to perform the methods of any of the embodiments disclosed above.

The instruction storage 240 may include a ROM (e.g. in the form of an electrically erasable programmable read-only memory (EEPROM) or flash memory) which is pre-loaded with the computer-readable instructions. Alternatively, the instruction storage 240 may include a RAM or similar type of memory, and the computer-readable instructions can be input thereto from a computer program product, such as a computer-readable storage medium such as a CD-ROM, etc.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present disclosure have been described above, it should be understood that they have been presented by way of example, and not limitation. It will be apparent to persons skilled in the relevant art(s) that various changes in form and detail can be made therein. Thus, the above-described example embodiments are not limiting.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A method comprising:
   determining, for each of a plurality of sensor modules, a distance from an object to a respective sensor module of the plurality of sensor modules by exchanging signals between the object and the respective sensor module;
   determining a starting reference space indicative of a position estimate of the object based on a plurality of determined distances and positions measured by the plurality of sensor modules;
   performing a plurality of successive division operations of the starting reference space for improving the position estimate of the object until a predetermined criterion is met, each division operation comprising:
      dividing a current reference space into subspaces, each subspace indicating a possible position of the object;
      assigning, on each of the subspaces, a confidence factor indicating a confidence that the object is positioned in the respective subspace; and
      selecting a new reference space from the subspaces based on the confidence factors; and
   determining a position of the object based on the new reference space according to the last division operation.

2. The method of claim 1, wherein the starting reference space and the subspaces are defined by boundaries parallel to one or more axes of a coordinate system.

3. The method of claim 2, wherein the coordinate system is defined in accordance with the distance measurements of the plurality of sensor modules.

4. The method of claim 3, wherein, in each division operation, the division of the current reference space is performed parallel to one or more axes of the coordinate system.

5. The method of claim 4, wherein the one or more axes of the coordinate system parallel to which the division is performed change between successive division operations.

6. The method of claim 1, wherein each division operation divides a current reference space into two subspaces of equal size.

7. The method of claim 1, wherein selecting the new reference space comprises:
   determining, for each subspace, a centroid of the respective subspace; and
   calculating, for each subspace, the confidence factor based on distances from the position of each sensor module to the centroid of the respective subspace and the distance determined by each sensor module.

8. The method of claim 1, wherein the plurality of distances includes a plurality of uncertainties based on a localization accuracy of each of the plurality of sensor modules.

9. The method of claim 1, wherein the predetermined criterion is met when at least one of a first criterion and a second criterion is met.

10. The method of claim 9, wherein the first criterion is met when a number of performed division operations exceeds a predetermined number.

11. The method of claim 9, wherein the second criterion is met when a size of the selected new reference space is smaller than a predetermined threshold size.

12. The method of claim 1, wherein the plurality of distances is determined based on at least one of time-of-flight measurements, signal strength measurements, or phase-based ranging.

13. The method of claim 1, wherein the object comprises at least one of a key, a wearable device, or a portable computing device.

14. The method of claim 1, wherein the device comprises at least one of a vehicle, a door, or a storage space.

15. The method of claim 14, further comprising:
   unlocking the device based on the determined position of the object.

16. The method of claim 15, wherein the object comprises a smartwatch worn by a user, and the determined position of the object is determined to be in proximity to at least one of the vehicle, the door, or the storage space.

17. The method of claim 1, wherein the device comprises a vehicle.

18. The method of claim 17, further comprising at least one of:
   starting an engine of the vehicle, dimming interior lights of the vehicle, or closing open windows of the vehicle based on the determined position of the object, the determined position of the object changing from outside the vehicle to inside the vehicle.

19. The method of claim 17, further comprising at least one of:
    locking doors of the vehicle or closing open windows of vehicle based on the determined position of the object, the determined position of the object changing from inside the vehicle to outside the vehicle.

20. The method of claim 1, wherein the object and the plurality of sensor modules are based on at least one of Bluetooth technology or Ultrawideband technology.

* * * * *